Patented July 2, 1940

2,206,081

UNITED STATES PATENT OFFICE 2,206,081

OPTICAL GLASS

Leon W. Eberlin, Rochester, N. Y., assignor to Eastman Kodak Company, Rochester, N. Y., a corporation of New Jersey No Drawing. Application September 1, 1936, Serial No. 98,932. In Great Britain September 3, 1935

11 Claims. (Cl. 106—36.1)

This invention relates to optical glass and specifically to improvements in glass of the type disclosed and generically claimed in application Serial No. 96,844, filed August 19, 1936, now Patent No. 2,150,694, granted March 14, 1939, by George W. Morey, which application discloses, as within the scope of the invention therein claimed, the formulae which are herein specifically claimed; it being understood that the instant formulae are modifications of those originated by Dr. Morey, and particularly formula C of his application. In the said Morey application, in formula C, as modified by the substitution of thorium for zirconium, was first suggested the use of lanthanum, titanium, thorium and boric oxides as major constituents of glass. The present invention is a modification of that formula involving the omission of titanium oxide and increasing the total proportions of the four other oxides mentioned.

The present application relates to formulae including as the principal components, lanthanum oxide ($La_2O_3$), tantalum oxide ($Ta_2O_5$), thorium oxide ($ThO_2$) and boric oxide ($B_2O_3$), these being present to the extent of at least 90% of the total and preferably more. As pointed out by Dr. Morey, thorium and zirconium are, to a certain extent, interchangeable and both may be present. In the preferred forms of my invention, I also contemplate the addition of other oxides and fluxing agents, such as borax or lithium nitrate; but titanium oxide is definitely omitted from these formulae.

In all of the examples, parts are given by weight, and the normal oxide of the element is referred to, unless otherwise specifically stated.

As illustrative of various embodiments of the preferred combination of oxides, the following are given as examples:

| Example | I | II | III | IV |
|---|---|---|---|---|
| Lanthanum | 37.5 | 36 | 26.7 | 22.2 |
| Tantalum | 29.2 | 28 | 26.7 | 22.2 |
| Thorium | 16.7 | 16 | 26.7 | 22.2 |
| Boron | 16.6 | 20 | 19.9 | 33.4 |

As illustrative of formulae including compounds in addition to the above mentioned oxides the following are given as examples:

| Example | V | VI | VII | VIII | IX |
|---|---|---|---|---|---|
| Lanthanum | 26.3 | 27.2 | 49.2 | 28 | 28 |
| Tantalum | 26.3 | 27.2 | 23 | 14 | 14 |
| Thorium | 20.2 | 18.5 | 9.8 | 28 | 28 |
| Boron | 22.7 | 22.6 | 9.8 | 22 | 20 |
| Zirconium | | | 4.9 | | |
| Borax | 4.5 | 4.5 | 3.3 | | |
| Lithium nitrate | | | | 8 | 10 |

The properties of the glasses obtained by the various formulae are as follows; the refractive indices for the C, D, F and G' lines being given, and also the dispersive index having the value $$\frac{nD-1}{nF-nC}$$

| Example | nC | nD | nF | nG | Dispersive index |
|---|---|---|---|---|---|
| I | | 1.898 | | | 39.6 |
| II | | 1.85 | | | 42 |
| III | | | | | |
| IV | 1.7132 | 1.7175 | 1.7266 | 1.7360 | 53.5 |
| V | 1.798 | 1.805 | 1.816 | | 40.3 |
| VI | 1.795 | 1.800 | 1.816 | | 38.4 |
| VII | 1.801 | 1.809 | 1.825 | | 35 |
| VIII | 1.8060 | 1.8119 | 1.8258 | | 41.15 |
| IX | 1.7985 | 1.8037 | 1.8175 | 1.8288 | 42.38 |

Having thus described my invention, what I claim as new and desire to secure by Letters Patent is:

1. A glass resulting from fusion of a glass batch consisting of the oxides of lanthanum, tantalum, thorium and boron.

2. A glass resulting from fusion of a glass batch containing at least 90% by weight of the oxides of lanthanum, tantalum, thorium and boron.

3. A glass resulting from fusion of a glass batch containing at least twenty percent by weight of lanthanum oxide, at least twenty percent tantalum oxide, at least eight percent of thorium oxide and at least eight percent of boron oxide, the amount of the said four oxides comprising at least ninety percent of the total.

4. A glass resulting from fusion of a glass batch which is substantially free of titanium oxide and of which at least 40% by weight comprises substantially equal amounts of the oxides of lanthanum and tantalum, and of which at least 15% by weight consists of boron oxide.

5. A glass resulting from fusion of a glass batch containing at least 90% by weight of the oxides of lanthanum, tantalum, thorium and boron, and also containing borax.

6. A glass resulting from fusion of a glass batch containing at least 90% by weight of the oxides of lanthanum, tantalum, thorium and boron and also containing lithium nitrate.

7. A glass, free from silica and titania, made from a glass batch comprising the oxides of lanthanum, tantalum, thorium and boron as predominating ingredients.

8. A glass resulting from fusion of a glass batch containing the oxides of each of lanthanum, tantalum, thorium and boron to a total of at least 90% by weight and substantially no titanium oxide.

9. A glass resulting from fusion of a glass batch containing at least twenty per cent by weight of lanthanum oxide, at least twenty per cent tantalum oxide, at least eight per cent thorium oxide, at least eight per cent boron oxide and substantially no titanium oxide.

10. A glass substantially free from silica and titania resulting from fusion of a glass batch containing the oxides of each of lanthanum, tantalum, thorium and boron to a total of at least 90% by weight and also containing borax.

11. A glass substantially free from silica and titania, resulting from fusion of a glass batch containing the oxides of each of lanthanum, tantalum, thorium, and boron to a total of at least 90% by weight and also containing lithium nitrate.

LEON W. EBERLIN.